(12) United States Patent
Strunk

(10) Patent No.: US 6,899,502 B2
(45) Date of Patent: May 31, 2005

(54) SELF-FILLING FASTENER AND METHOD OF MAKING

(75) Inventor: Jeffrey L. Strunk, Eustis, ME (US)

(73) Assignee: Khameleon Nails, Inc., Carrabassett, ME (US)

( * ) Notice: Subject to any disclaimer, the term of this patent is extended or adjusted under 35 U.S.C. 154(b) by 0 days.

(21) Appl. No.: 10/611,468

(22) Filed: Jun. 30, 2003

(65) Prior Publication Data
US 2004/0265093 A1 Dec. 30, 2004

(51) Int. Cl.⁷ .............................................. F16B 15/00
(52) U.S. Cl. ..................... 411/469; 411/480; 411/442; 411/923; 411/902
(58) Field of Search ................................ 411/469, 480, 411/482, 902, 903, 908, 923, 442

(56) References Cited

U.S. PATENT DOCUMENTS

| | | | | |
|---|---|---|---|---|
| 2,528,288 A | * | 10/1950 | Rublee | 411/480 X |
| 2,724,303 A | * | 11/1955 | Holcomb | 411/439 |
| 3,076,373 A | * | 2/1963 | Matthews | 411/522 |
| 3,240,101 A | * | 3/1966 | Hallock | 411/447 |
| 3,357,296 A | * | 12/1967 | Lefever | 411/469 |
| 3,469,490 A | * | 9/1969 | Pearce | 411/371.1 |
| 3,750,523 A | * | 8/1973 | Fujita | 411/484 |
| 4,116,106 A | | 9/1978 | Barbour | |
| 4,630,168 A | * | 12/1986 | Hunt | 361/218 |
| 4,632,616 A | * | 12/1986 | Sidoti | 411/480 |
| 4,723,540 A | * | 2/1988 | Gilmer, Jr. | 411/469 X |
| 4,829,674 A | * | 5/1989 | Warren | 30/169 |
| 4,884,929 A | * | 12/1989 | Smith et al. | 411/3 |
| 4,979,281 A | * | 12/1990 | Smith et al. | 29/525.11 |
| 5,749,670 A | * | 5/1998 | Astor | 403/269 |
| 5,772,379 A | * | 6/1998 | Evensen | 411/442 |
| 6,274,651 B1 | * | 8/2001 | Burrell | 523/521 |

* cited by examiner

Primary Examiner—Flemming Saether
Assistant Examiner—Katherine Mitchell
(74) Attorney, Agent, or Firm—Pierce Atwood; Kevin M. Farrell

(57) ABSTRACT

A fastener, such as a nail or staple, includes a fastener body having an impact surface and a plug of filler material joined to the impact surface. The plug of filler material fills the hole made by the fastener body when the fastener is driven into a workpiece. Many types of fasteners can be used, such as nails and staples. In the case of a nail, the plug of filler material would be joined to the nail head. In the case of a U-shaped staple, the plug of filler material would be joined to the cross member joining the staple legs. The filler material can be a wide variety of materials such as wood putty, acrylic sealant, fiberglass resin fillers, epoxy adhesives, and plastic.

28 Claims, 2 Drawing Sheets

SELF-FILLING FASTENER AND METHOD OF MAKING

BACKGROUND OF THE INVENTION

This invention relates generally to fasteners and more particularly to fasteners that include means for filling workpiece holes.

Fasteners such as nails and staples are widely used for joining materials together. In many applications, such as furniture making, cabinet making and finish work (i.e., the installation of wood trim, baseboard, molding and the like), it is common to drive the fastener below the surface level of the workpiece. The resulting hole is then covered with a filler material that conceals the presence of the fastener.

Because skilled labor is typically used to perform this type of work, it is desirable to be as productive as possible. Accordingly, the use of powered nail and staple guns has grown significantly. These devices allow workers to drive fasteners more quickly and with less physical effort when compared to manually driving fasteners with a hammer. Nail and staple guns also typically allow the user to control the depth that the fasteners are driven. However, the subsequent resurfacing work is still time consuming and therefore very expensive. Typically, after a number of fasteners have been driven, a worker returns to fill the fasteners holes with a filler material such as wood putty. Traditional application requires a worker to putty each individual fastener hole and then wait for the putty to dry. The workpiece surface is then sanded to provide an unblemished appearance. Additional applications are often needed.

Accordingly, there is a need for a fastener that reduces that amount of time required for resurfacing work.

SUMMARY OF THE INVENTION

The above-mentioned need is met by the present invention, which provides a fastener comprising a fastener body having an impact surface and a plug of filler material joined to the impact surface. The plug of filler material fills the hole made by the fastener body when the fastener is driven into a workpiece. Many types of fasteners can be used, such as nails and staples. In the case of a nail, the plug of filler material would be joined to the nail head. In the case of a U-shaped staple, the plug of filler material would be joined to the cross member joining the staple legs. The filler material can be a wide variety of materials such as wood putty, acrylic sealant, fiberglass resin fillers, epoxy adhesives, and plastic.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
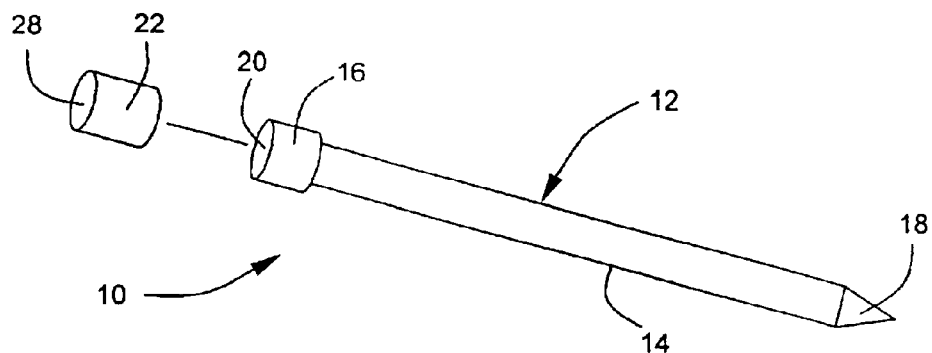
FIG. 1 is an exploded perspective view of a finish nail with a plug of filler material.
Figure 2:
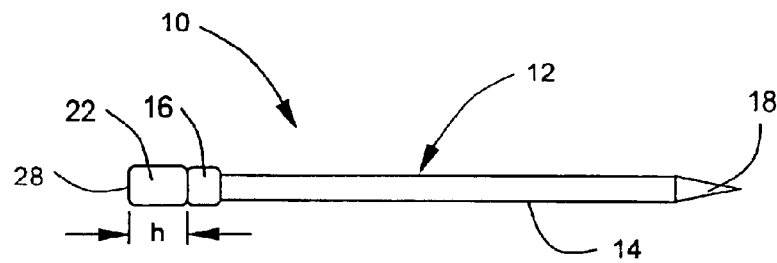
FIG. 2 is a side view of the nail of FIG. 1.

Referring to the drawings wherein identical reference numerals denote the same elements throughout the various views, FIGS. 1 and 2 show a fastener 10. While the fastener 10 of FIGS. 1 and 2 is a finish nail, it should be noted that the present invention is not limited to finish nails and includes many other types of fasteners, such as nails of all types and staples.

The fastener 10 includes a one-piece fastener body 12 comprising an elongated shaft or shank 14 having a head 16 formed on one end thereof and a pointed tip 18 formed on the other end thereof. The fastener body 12 can be made out of any suitable material such as hardened aluminum or galvanized steel. As shown in the Figures, the shank 14 and the head 16 both have circular cross-sectional shapes but could have just about any cross-sectional shape including square or rectangular. The cross-sectional area of the head 16 is slightly larger than that of the shank 14.

In and off itself, the fastener body 12 is not necessarily distinguishable from conventional fasteners of the same type, a finish nail in the illustrated example. Thus, the head 16 defines a substantially flat surface 20 on the outermost end thereof. With conventional fasteners, this surface would be struck with a hammer or the like to drive the fastener into a workpiece. Accordingly, surface 20 is referred to herein as the impact surface. As used herein, the term "impact surface" refers to any surface on a fastener body that corresponds to the surface of a conventional fastener that is intended to be struck by an implement in order to drive the fastener into a workpiece.

The fastener 10 further includes a plug 22 of filler material joined to the impact surface 20. As described below, the plug 22 is intended to fill the hole made by the fastener body 12 when the fastener 10 is driven into a workpiece. Thus, the plug 22 and the head 16 should have similar cross-sectional shapes. In the case of a round head, the plug 22 will have a generally cylindrical shape. For a rectangular head, the plug 22 would have a rectangular prismatic shape. The cross-sectional area of the plug 22 is preferably the same as or slightly larger than the cross-sectional area of the head 16. The height, h, of the plug 22 will vary depending on the application but should generally be at least equal to the depth that the fastener 10 will typically be driven into a workpiece so as to fill the hole made by the fastener body 12.

The plug 22 can be made of a variety of filler materials. Generally, the filler material should be durable and capable of being sanded. One possible filler material is wood putty. As used herein, wood putty refers to a composite material having a binder, such as wood finish or glue, mixed with a filler such as sawdust, calcium carbonate, gypsum or the like. Either of the commercially available glues known as "Gorilla Glue" or Elmer's Glue" mixed with sawdust provides a particularly useful filler material. Other possible filler materials include an acrylic sealant material, such as any of the sealants sold commercially by Perma-Chink Systems, Inc. of Redmond, Wash., a fiberglass resin filler, such as the BHS All Purpose Fiberglass Resin sold commercially by the Bondo Corporation of Atlanta, Ga., and epoxy adhesives, such as the BHS Extra Strength Wood Repair Epoxy sold commercially by the Bondo Corporation. The filler material can also be any suitable plastic material such as a polycarbonate. The filler material can be a variety of colors to match various wood or plastic finishes.

The plug 22 can be joined to the head 16 using glue or another type of adhesive. Depending on the type of filler material that the plug 22 is made of, the plug 22 can also be joined by the inherent adhesive characteristics of the filler material. For example, when using materials such as wood putty or an acrylic sealant for the filler material, a dab of uncured filler material can be placed on the impact surface 20 in the desired shape of the plug 22 and then allowed to cure. The hardened material will form the plug 22 and be joined to the head 16.

The head 16, and particularly the impact surface 20, can be made to facilitate joining of the plug 22 thereto. For instance, roughening the impact surface 20 will increase the adhesion between the plug 22 and the head 16.

Figure 3:
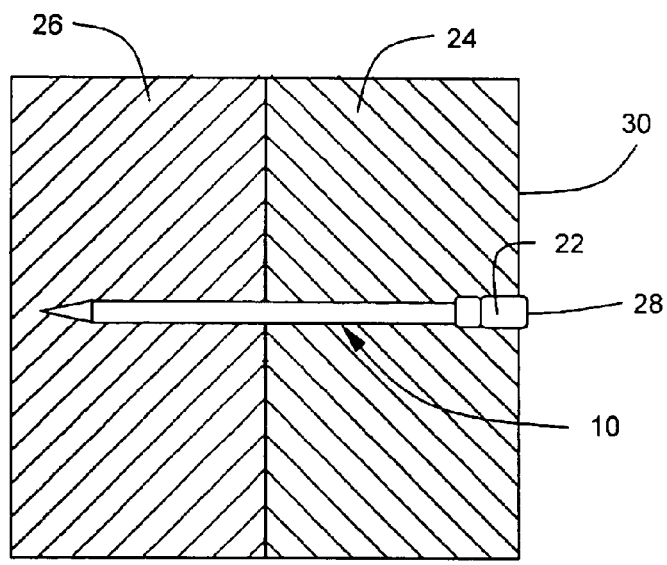
FIG. 3 is a sectional view of two workpieces joined together by the nail of FIG. 1.

Referring to FIG. 3, two wooden workpieces 24 and 26 are shown secured together by the fastener 10. Using a hammer, nail gun or any other suitable device, the fastener 10 is driven (by striking the outermost surface 28 of the plug 22 with a driving force) into a first surface 30 of the first workpiece 24 so as to extend entirely through the first workpiece 24 and into the second workpiece 26. The fastener 10 is driven to a depth such that the head 16 is entirely below the surface 30 of the first workpiece 24 and the outermost surface 28 of the plug 22 is either flush with or slightly above the workpiece surface 30. Thus, the plug 22 fills the hole in the first workpiece 24 made by the fastener body 12, i.e., the space between the impact surface 20 of the head 16 and the workpiece surface 30. The outermost surface 28 of the plug 22 can then be sanded, if necessary, to give the workpiece surface 30 an unblemished appearance and conceal the presence of the fastener 10.

Figure 4:
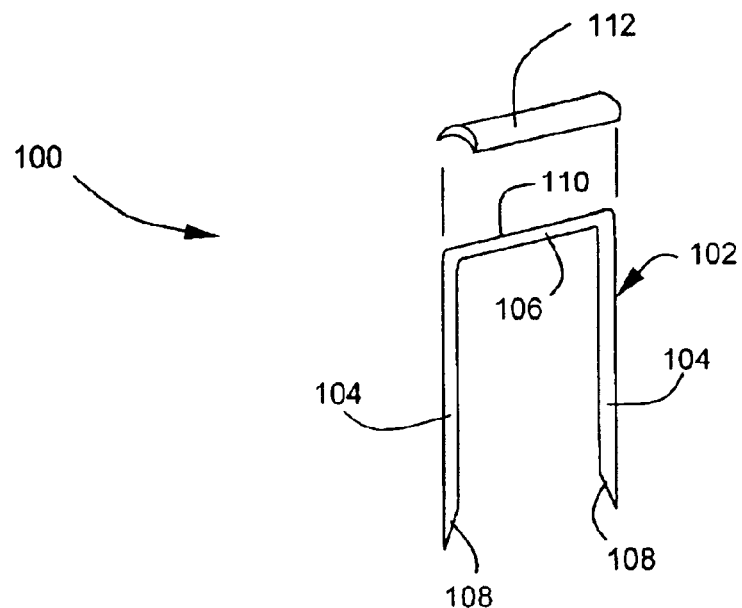
FIG. 4 is an exploded perspective view of a staple with a plug of filler material.
Figure 5:
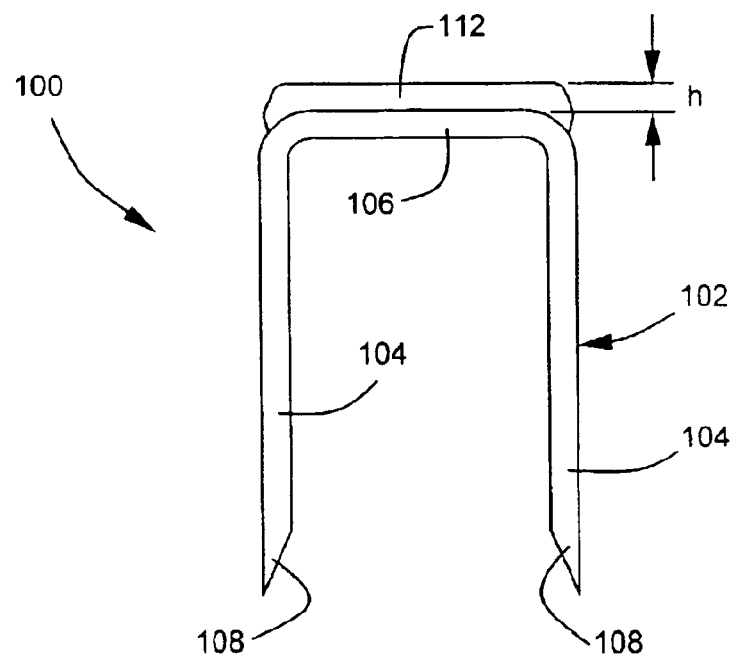
FIG. 5 is a side view of the staple of FIG. 4.

Referring now to FIGS. 4 and 5, a fastener 100 in accordance with a second embodiment of the present invention is shown. The fastener 100 is a staple having a U-shaped, one-piece fastener body 102 comprising two legs 104 formed at opposing ends of a cross member 106 and extending outwardly therefrom. Each leg 104 terminates in a sharp tip 108. The cross member 106 defines an uppermost surface 110, which functions as the impact surface. The fastener body 102 can be made out of any suitable material such as hardened aluminum or galvanized steel.

The fastener 100 further includes a plug 112 of filler material joined to the impact surface 110. As described below, the plug 112 is intended to fill the hole made by the fastener body 102 when the fastener 100 is driven into a workpiece. Thus, the plug 112 and the cross member 106 should have similar cross-sectional shapes. In this case, the plug 112 is an elongated section of substantially equal, or slightly greater, length and width as the cross member 106. The height, h, of the plug 112 will vary depending on the application but should generally be at least equal to the depth that the fastener 100 will typically be driven into a workpiece so as to fill the hole made by the fastener body 102. The plug 112 can be made of a variety of filler materials, including those described above in connection with the first embodiment. Furthermore, the plug 112 can be attached to the impact surface 110 in a manner similar to that of the first embodiment, including roughening the impact surface 110 to increase adhesion between the plug 112 and the cross member 106.

While the present invention has been described in terms of a single fastener, it should be noted that a plurality of such fasteners could be joined together in a strip or coil of fasteners for use with a powered nail or staple gun. Indeed, the present invention is believed to be particularly well suited for used with nail or staple guns.

While specific embodiments of the present invention have been described, it will be apparent to those skilled in the art that various modifications thereto can be made without departing from the spirit and scope of the invention as defined in the appended claims.

What is claimed is:

1. A non-threaded driven fastener comprising:
   a fastener body having an impact surface and either a head or a cross-member; and
   a plug of filler material joined directly to said impact surface prior to said fastener being driven, said filler material not extending past the head or crossmember, said filler material being sized and shaped to fill a hole in a workpiece made by penetration of the head or cross-member into the workplace.

2. The fastener of claim 1 wherein said filler material is an acrylic sealant material.

3. The fastener of claim 1 wherein said filler material is a wood putty.

4. The fastener of claim 1 wherein said filler material is a fiberglass resin filler.

5. The fastener of claim 1 wherein said filler material is an epoxy adhesive.

6. The fastener of claim 1 wherein said filler material is a plastic material.

7. The fastener of claim 1 wherein said impact surface includes means for facilitating joining said plug of filler material to said impact surface.

8. The fastener of claim 1 wherein said impact surface is roughened.

9. The fastener of claim 1 wherein said plug of filler material is joined directly to said impact surface with an adhesive.

10. The fastener of claim 1 wherein said fastener body includes at least two legs.

11. A nail comprising:
    a shank having a head formed at one end thereof, the head having an impact surface; and
    a plug of filler material joined directly to said impact surface of the head prior to said fastener being driven, said filler material not encasing the entire fastener body, said filler material being sized and shaped to fill a hole in a workpiece made by penetration of the head into the workpiece.

12. The nail of claim 11 wherein said filler material is an acrylic sealant material.

13. The nail of claim 11 wherein said filler material is a wood putty.

14. The nail of claim 11 wherein said filler material is a fiberglass resin filler.

15. The nail of claim 11 wherein said filler material is an epoxy adhesive.

16. The nail of claim 11 wherein said filler material is a plastic material.

17. The nail of claim 11 wherein said impact surface includes means for facilitating joining said plug of filler material to said impact surface.

18. The nail of claim 11 wherein said impact surface is roughened.

19. The nail of claim 11 wherein said plug of filler material and said head have similar cross-sectional shapes.

20. The nail of claim 11 wherein said plug of filler material is joined directly to the impact surface with an adhesive.

21. A method of making a non-threaded driven fastener comprising:

providing a fastener body having an impact surface and either a head or a cross-member; and joining a plug of filler material directly to said impact surface prior to said fastener being driven, said filler material not extending past the head or crossmember, said filler material being sized and shaped to fill a hole in a workpiece made by penetration of the head or cross-member into the workpiece.

22. The method of claim 21 wherein said filler material is an acrylic sealant material.

23. The method of claim 21 wherein said filler material is a wood putty.

24. The method of claim 21 wherein said filler material is a fiberglass resin filler.

25. The method of claim 21 wherein said filler material is an epoxy adhesive.

26. The method of claim 21 wherein said filler material is a plastic material.

27. The method of claim 21 further comprising roughening said impact surface prior to joining said plug of filler material to said impact surface.

28. The method of claim 21 further comprising using an adhesive to join said plug directly to said impact surface.

* * * * *